(12) United States Patent
Rappoport (10) Patent No.: US 12,553,985 B2
(45) Date of Patent: Feb. 17, 2026

(54) GEOLOCATION SYSTEM USING NYQUIST-FOLDING RECEIVERS

(71) Applicant: Kevin J Rappoport, Evans, GA (US)

(72) Inventor: Kevin J Rappoport, Evans, GA (US)

( * ) Notice: Subject to any disclaimer, the term of this patent is extended or adjusted under 35 U.S.C. 154(b) by 0 days.

(21) Appl. No.: 18/868,347

(22) PCT Filed: May 31, 2024

(86) PCT No.: PCT/US2024/032118
§ 371 (c)(1),
(2) Date: Nov. 22, 2024

(87) PCT Pub. No.: WO2024/249943
PCT Pub. Date: Dec. 5, 2024

(65) Prior Publication Data
US 2025/0172653 A1 May 29, 2025

Related U.S. Application Data

(60) Provisional application No. 63/470,707, filed on Jun. 2, 2023.

(51) Int. Cl.
*G01S 5/02* (2010.01)
*G01S 3/04* (2006.01)

(52) U.S. Cl.
CPC ............ *G01S 5/0284* (2013.01); *G01S 3/043* (2013.01)

(58) Field of Classification Search
None
See application file for complete search history.

(56) References Cited

U.S. PATENT DOCUMENTS

| | | | |
|---|---|---|---|
| 8,548,111 B2* | 10/2013 | Mateman | H03D 3/006 375/360 |
| 9,966,990 B1 | 5/2018 | Hudo et al. | |
| 11,251,832 B2* | 2/2022 | Fudge | H04B 1/0007 |
| 2007/0086544 A1 | 4/2007 | Fudge | |
| 2014/0247187 A1* | 9/2014 | Harada | G01S 5/0273 342/465 |
| 2017/0264386 A1 | 9/2017 | Braz et al. | |
| 2018/0063012 A1 | 3/2018 | Stapleton et al. | |
| 2021/0273677 A1 | 9/2021 | Fudge et al. | |

\* cited by examiner

*Primary Examiner* — Adolf Dsouza
(74) *Attorney, Agent, or Firm* — Leyendecker & Lemire LLC (57) ABSTRACT

A geolocation system for efficiently reconstructing and geolocating signals collected in multiple spatially-distributed sensors using a plurality of different Nyquist-folding samplers operating at sub-Nyquist rates. The sensors use Nyquist-folding with a plurality of sampling rates and patterns to reduce the volume of data transmitted off the sensor while retaining the ability to detect weak signals, and produce high-quality signal reconstructions and geolocations. The ambiguities in signal reconstruction introduced by sub-Nyquist sampling are addressed by using spatial consistency computed from sub-Nyquist geo-observables to assist in RF ambiguity resolution.

7 Claims, 7 Drawing Sheets

GEOLOCATION SYSTEM USING NYQUIST-FOLDING RECEIVERS

RELATED REFERENCES

This application claims priority to and incorporates fully by reference U.S. provisional patent application 63/470,707 filed on Jun. 2, 2023. The present application has the same inventor as the priority application.

BACKGROUND

The invention addresses the efficient collection, storage, transmission, and processing of Radio Frequency (RF) data, typically Nyquist-folded RF data, collected by remote sensors (also referred to interchangeably as "collectors" and "receivers") and forwarded to a data processing center for processing and exploitation.

The sensors can be deployed on remote collection platforms such as, but not limited to, a UAV, aircraft, balloon, drone, or other mobile conveyance with limited cargo and power capacity. The processing center can be located at a fixed ground site, or on some other mobile platform with adequate power and processing capacity to support processing and exploitation.

Figure 1:
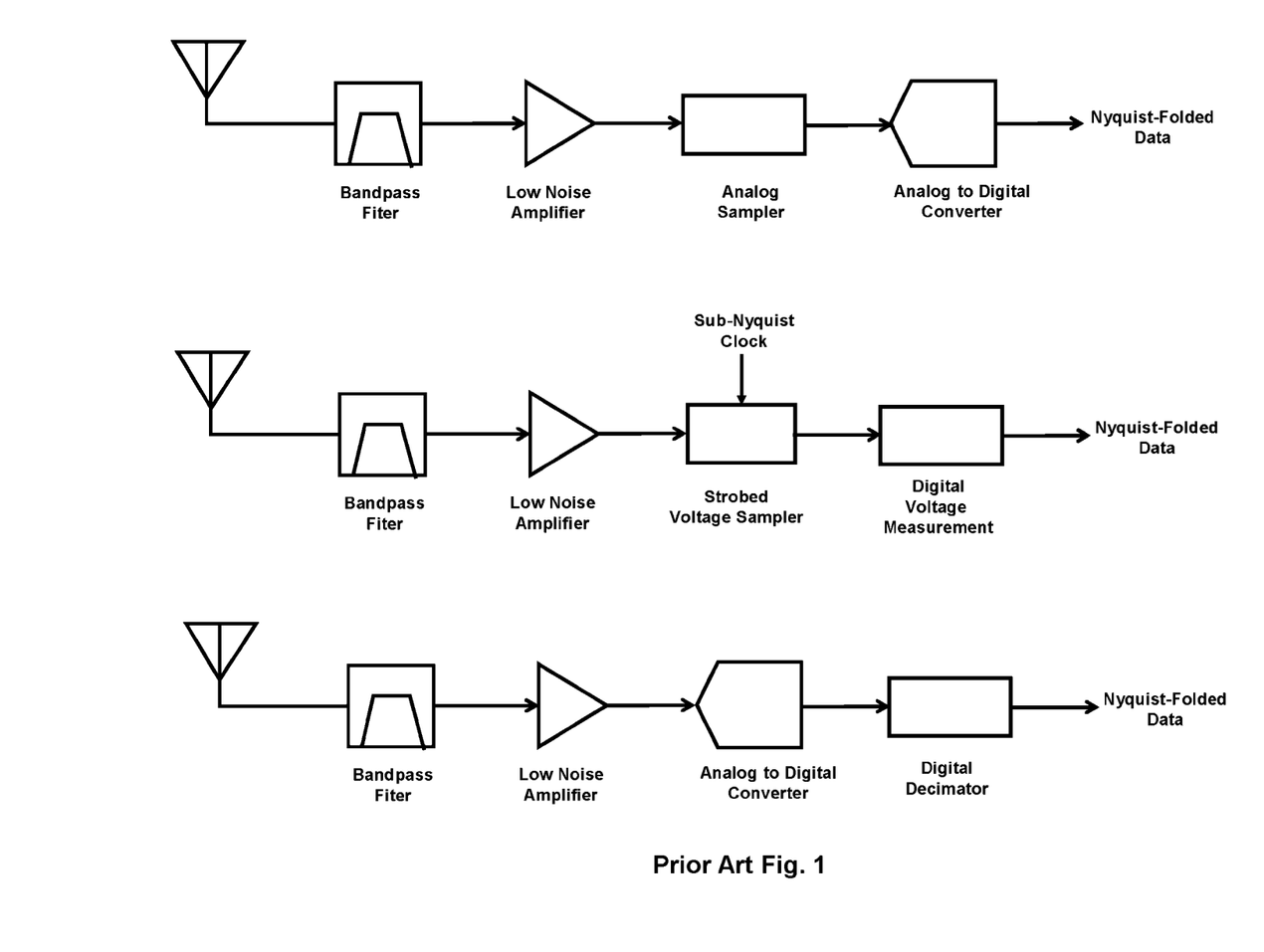
FIG. 1 is a block diagram illustrating three processes of producing Nyquist-folded data.

The RF data is captured as a sequence of electrical measurements (electrical samples) which are eventually converted into a digital format (digital samples) for storage, transmission, and processing. As shown in FIG. 1, the RF is received and converted to digital samples at sub-Nyquist rates. The receiver may either create analog samples followed by analog processing prior to digitization, the receiver may digitize the signals directly at sub-Nyquist rates, or the receiver may sample at Nyquist-rate using a high-rate Analog to Digital Converter (ADC) followed by digital decimation.

Nyquist-folding is used in either embodiment, and serves to reduce the amount of data that must be stored on-board the sensor and transmitted off the sensors to the processing center. Applications include Synthetic Aperture Radar (SAR) imaging, Surveillance Radar, Bistatic Radar, Radar Warning Receivers and Radar Detectors, Electronic Signals Surveillance and Interception, and other uses.

Figure 2:
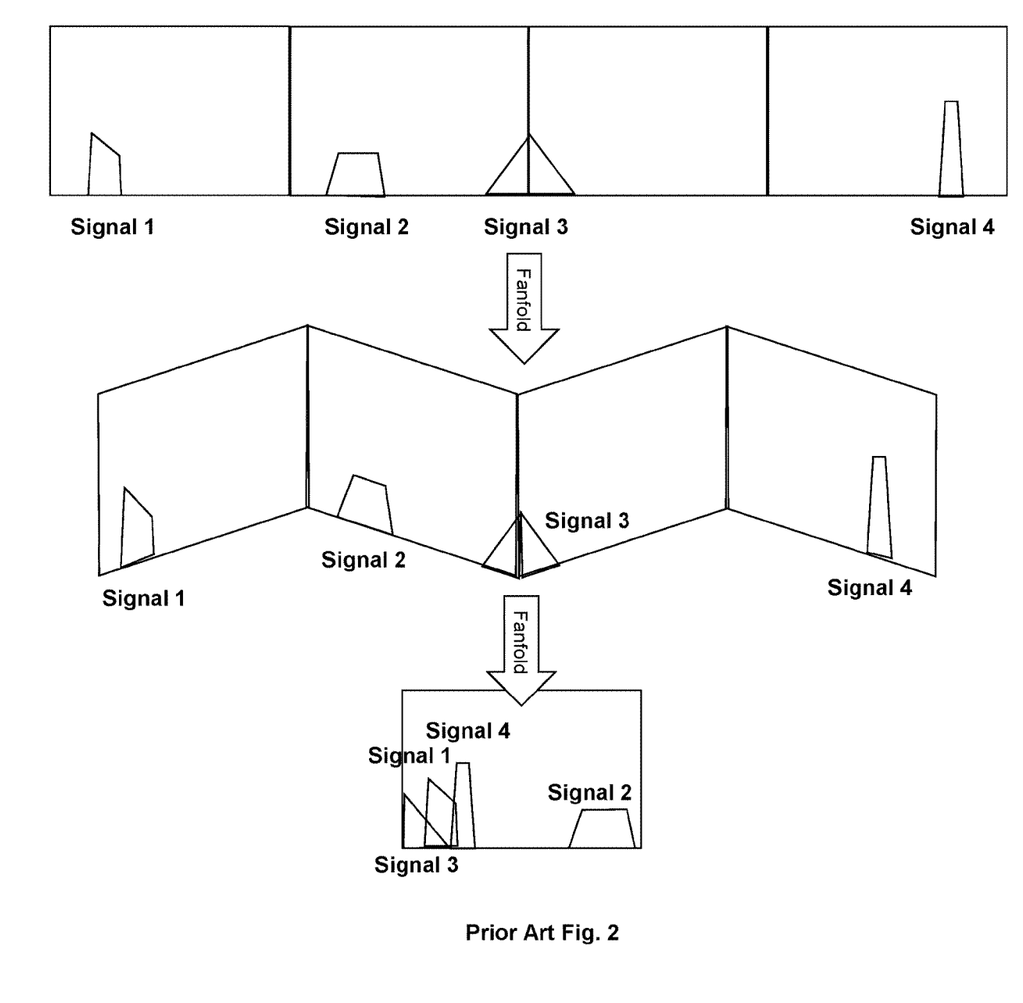
FIG. 2 is an illustration of how Nyquist-folding can produce frequency ambiguities by folding signals at different RFs onto the same folded RF.

Nyquist-folding on-board the collector greatly reduces the storage and downlink requirements, but introduces ambiguity in the RF of any signals extracted from the Nyquist-folded data as illustrated in FIG. 2. Nyquist folding causes the collected frequency spectrum to be folded back onto itself in alternating regions of negative and positive frequencies, producing ambiguity in the frequency measurement made for any signal in the folded spectrum. The RF ambiguity can only be resolved by application of additional signal processing techniques to multiple simultaneously-collected Nyquist-folded data streams sampled at different rates.

The acquisition, sampling, transformation, and transmission of RF data is described in PCT patent application PCT/US24/23411 filed on Apr. 5, 2024 entitled A Remote Sensor RF Receiver System which has the same inventor has the present application and is incorporated herein by reference in its entirety.

Prior art for resolving the RF ambiguity of Nyquist-folded data is to create multiple Nyquist-folded collections of the signal sampled at different folding rates on-board the collector. The signal of interest appears at a different frequency within the simultaneously-collected data sets due to the different folding rates used in each data set, and number-theoretic techniques are used to identify the correct frequency from the multiple ambiguous RF measurements taken at different folding rates. U.S. Pat. No. 11,251,832, which is incorporated herein by reference, teaches that three or more samplers simultaneously operating at different sample rates are required to resolve the RF ambiguity in the receiver. When multiple similar signals are present in the environment, finding the correct match between samplers becomes more difficult, which is addressed by using additional folded data streams. As more streams are required, the storage and downlink requirements increase, thus reducing the bandwidth-saving advantages of Nyquist-folded data.

Figure 3:
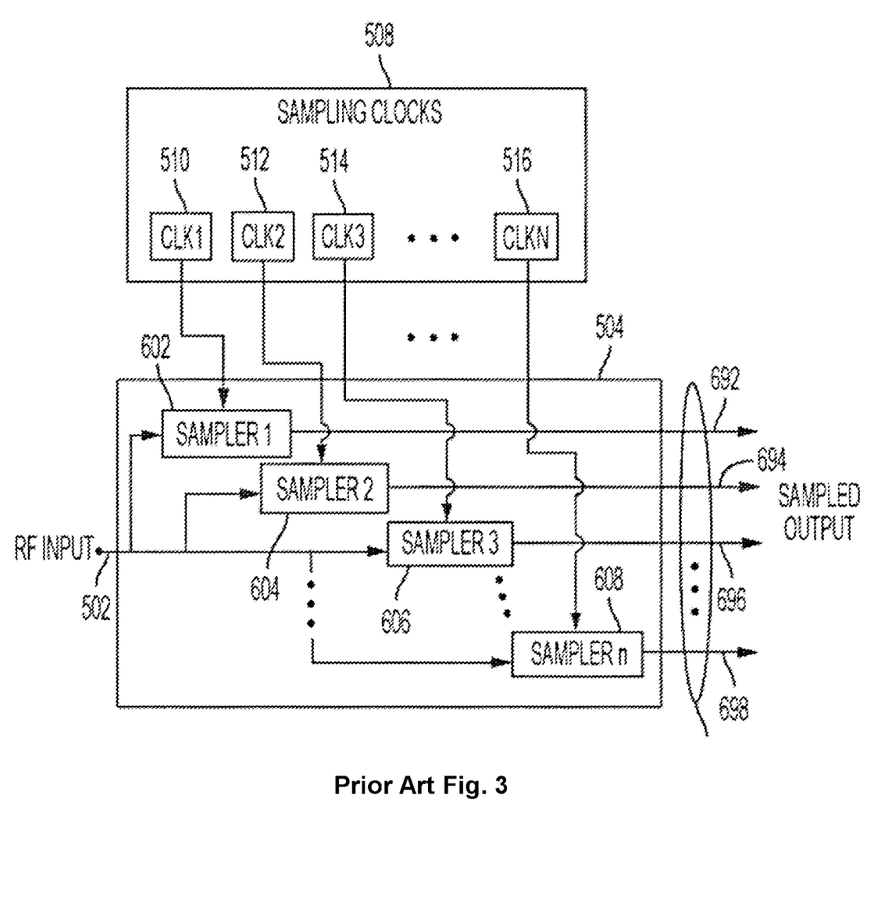
FIG. 3 is a block diagram from U.S. Pat. No. 11,251,832 illustrating the configuration of a collector wherein each sampler is located on the same collector.

Prior art requires that all the samplers in the Nyquist-Folding Receiver operate on the same received signal as indicated in FIG. 3 (FIG. 3 is FIG. 6b from U.S. Pat. No. 11,251,832). In FIG. 3, all samplers are shown to operate on analog data collected through a single antenna of a single collector/receiver.

BRIEF DESCRIPTION OF THE DRAWINGS

1) Prior Art

2) Prior Art

3) Prior Art

DETAILED DESCRIPTION

Figure 4:
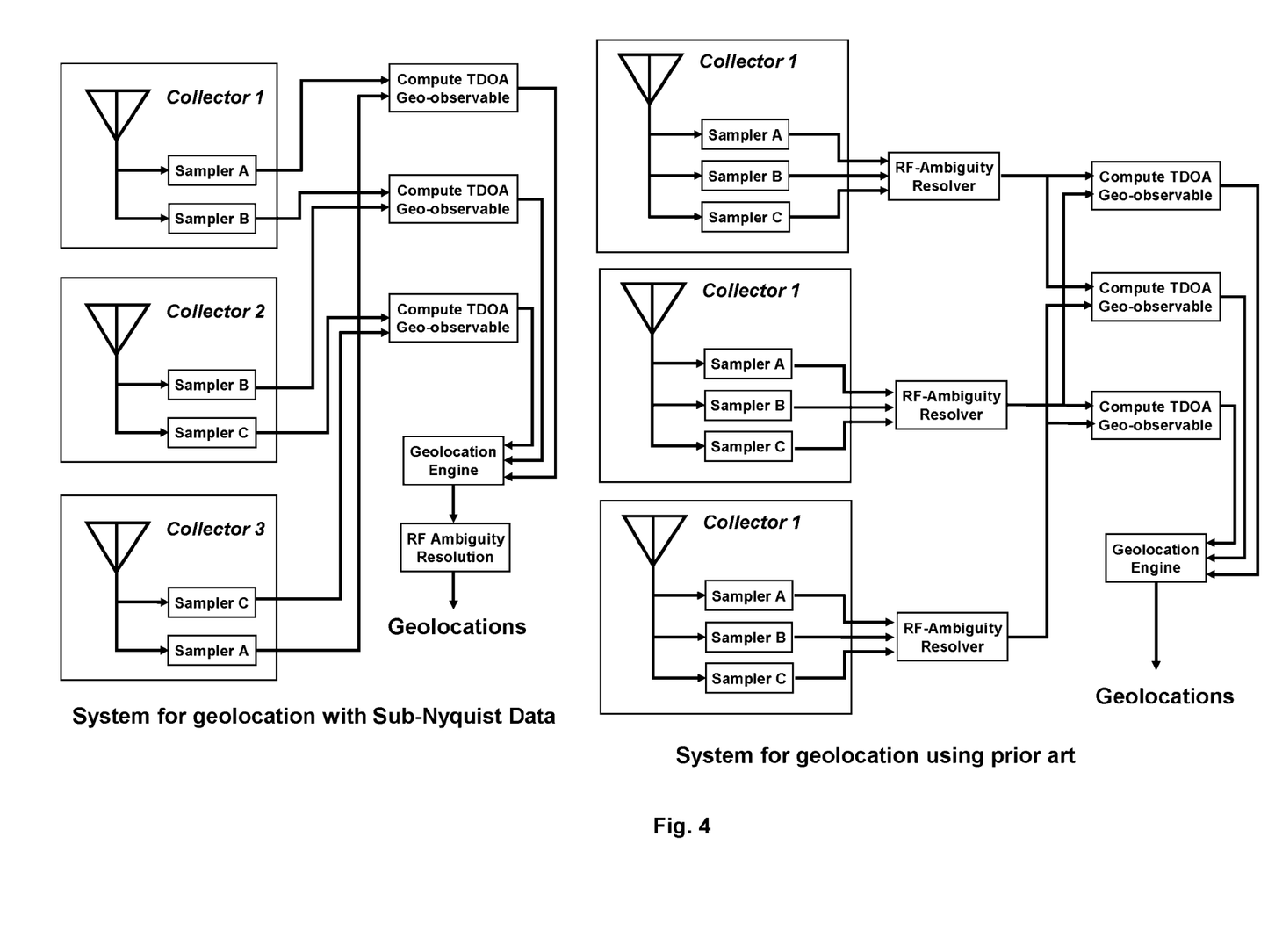
FIG. 4 is a block diagram comparing co-located sampler vs. spatially distributed samplers according to embodiments of the present invention.

Embodiments of the present invention removes the practice of sampling from a single collector/receiver at a single location as practiced in the prior art, and distributes the plurality of samplers across multiple collectors/receivers. The plurality of sample streams collected at different locations from different collectors/receivers is transmitted to processing center, where it is combined to resolve the RF ambiguities across the sampled streams and to accurately reconstruct the signal as shown in FIG. 4.

Utilizing multiple collectors/receivers at diverse locations to collect the sampled data has several advantages. First, certain vantage points may offer better signal detection for specific folding rates due to differences in the power of nuisance signals that are folded on top of a signal of interest. Second, collection from multiple collectors/receivers at diverse locations allows the use of spatial information to help resolve the RF ambiguity and aid in signal reconstruction.

The additional spatial information used to aid in RF ambiguity resolution and signal reconstruction is provided by geo-observable measurements that link a signal to a set of possible locations from which the signal was emitted. Geo-observables can be calculated from a single collection point, such as angle-of-arrival, or can be calculated from a pair of collection points such as Time Difference of Arrival. By combining treatment of geo-observables with RF-ambiguous signal measurements from spatially-distributed samplers, the RF ambiguity inherent in Nyquist-Folded Receivers can be resolved to geolocate the signal.

As indicated above, embodiments of the present invention resolve the RF ambiguity inherent in Nyquist-folded data while requiring fewer samplers per collector/receiver than is taught by prior art. The reduction is achieved by incorporating additional spatial information computed from Nyquist-folded data sampled at the same rate on different collectors located at different locations. The new spatial information is then combined with the frequency information from prior art solutions to simultaneously achieve RF ambiguity resolution and signal geolocation.

The additional spatial information is obtained by computing a geo-observable, such as TDOA (Time Difference of Arrival) or FDOA (Frequency Difference of Arrival), between two samplers operating at the same rate but located on different collectors. Multiple geo-observables computed from paired samplers located on different collectors is used to test the spatial consistency for a putative set of RF-ambiguous Nyquist-folded data streams collected on a plurality of collectors. The putative RF-ambiguous measurement sets that pass the spatial test can also be tested using the RF-consistency tests known in the art to resolve the RF ambiguity.

The inclusion of geo-observables in the RF-ambiguity resolution process also allows each collector to use different sampling rates, thus increasing the number of unique sampling rates that can be used for ambiguity resolution and signal reconstruction while simultaneously reducing on-board storage and off-board transmission requirements. The information provided by spatial consistency tests and RF consistency tests is independent and can be performed in any order, and multiple embodiments exist depending upon the order in which consistency tests are performed.

Figure 5:
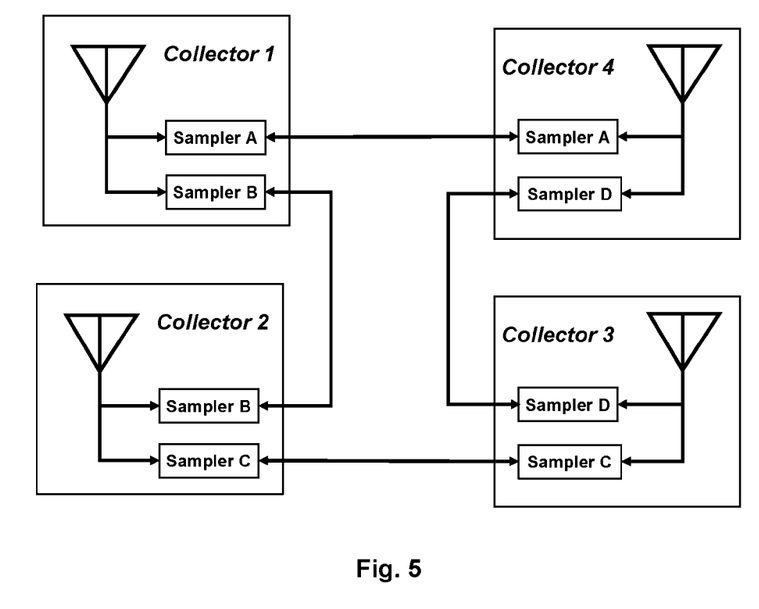
FIG. 5 is a block diagram illustrating a grouping of four collectors wherein each has one or two samplers and illustrating the pairings of the samplers between collectors according to embodiments of the present invention.

FIG. 5 illustrates an example of a multiple collector configuration that can be utilized with embodiments of the present invention for collecting and transmitting both samples and geo-observables to a processing center for processing and exploitation. In this configuration each collector uses different pairs of samplers that are matched pairwise across collectors to support calculation of TDOA geo-observables between matched sampler pairs. The configuration provides four independent TDOA geo-observables to support rapid geolocation, and four different sample rates to support robust ambiguity resolution and signal reconstruction. As can be appreciated, collector configurations can vary substantially and significantly as would be obvious to one of ordinary skill given the benefit of the present disclosure, and as such, this example should not be considered exclusive.

By contrast, using a traditional Nyquist-Folding Receiver of prior art on each collector requires that all receivers be identical to support pairwise calculation of TDOA geo-observables. Such a configuration would provide four independent geo-observables, but only two different sample rates. U.S. Pat. No. 11,251,832 teaches us that 3 or more samplers are required to resolve the RF ambiguity in a Nyquist-Folding receiver. By distributing different sample rates across the collectors and combining the geolocation calculation with the RF ambiguity resolution calculation, the invention allows the number of samplers required per collector to be reduced over prior art while increasing the total number of sample rates available for RF ambiguity resolution and signal reconstruction. Increasing the number of sample rates improves RF ambiguity resolution and signal reconstruction in dense RF environments.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

Unless otherwise indicated or dictated by context, the terms "approximately" and "about" mean +−20%. Unless otherwise indicated or dictated by context, the term "substantially" means +−10%. The term "generally" means for the most part.

An "Analog to Digital Converter", or "ADC" is an electronic device that samples an analog signal as either a single voltage or as In-phase and Quadrature (I&Q) voltage pairs at regular intervals and converts the measured values into a stream of digital numbers.

An "Analog Signal" is a continuously varying voltage within an electrical circuit that can be operated on by analog components to perform amplification, filtering, interpolation, and voltage measurement.

A "Passband" is a continuous range of frequencies with defined upper and lower frequency values.

A "Bandpass Filter", or "BPF" is an analog component that passes a continuous range of frequencies, or passband, while suppressing frequencies outside that range.

A "Bandwidth" is the difference between the upper and lower bounds for a continuous range of frequencies.

A "Received Bandwidth" is the range of RF frequencies simultaneously collected by the receiver and converted to a digital format for storage on-board and/or export off-board the receiver.

A "Digital Sample" is a single measurement of voltage, amplitude, or some other electrical parameter of an analog signal taken at an instant in time and converted into a digital value.

A "Digitized Signal" is a sequence of digital samples that represent a series voltage measurements made on an analog signal over time.

A "Geo-observable" is a measurement computed from sampled signal data that provides information on the spatial location of an emitter. Examples include TDOA and FDOA measurements made from a signal collected in two spatially-separated sensors.

A "Low Noise Amplifier", or "LNA", is an analog device to amplify an analog signal with low distortion.

A "Nyquist Rate" is the rate at which a signal must be sampled in order to prevent aliasing. The Nyquist rate is twice the signal frequency.

"Nyquist-Sampled Data" is a is digitized signal in which the digital samples have been measured at a constant rate, and the measurement rate is at, or above, the Nyquist rate. For the purposes of this application, the output of an ADC is "Nyquist-Sampled Data"

"Folded Spectrum" is a sequence of power measurements for a range of frequencies produced from "Sub-Nyquist-Sampled Data"

"Sub-Nyquist geo-observable" is a geo-observable computed from sub-Nyquist sampled data sampled at the same rate in two or more collectors.

"Sub-Nyquist-Sampled Data" is a subset of the digital samples drawn from a "Nyquist-Sampled Data".

A "Signal to Noise Ratio", or "SNR", describes the relative energy in a signal of interest to the noise background.

A "Subsampled signal" is analog or digital signal in which samples are taken at below the Nyquist rate.

Figure 6:
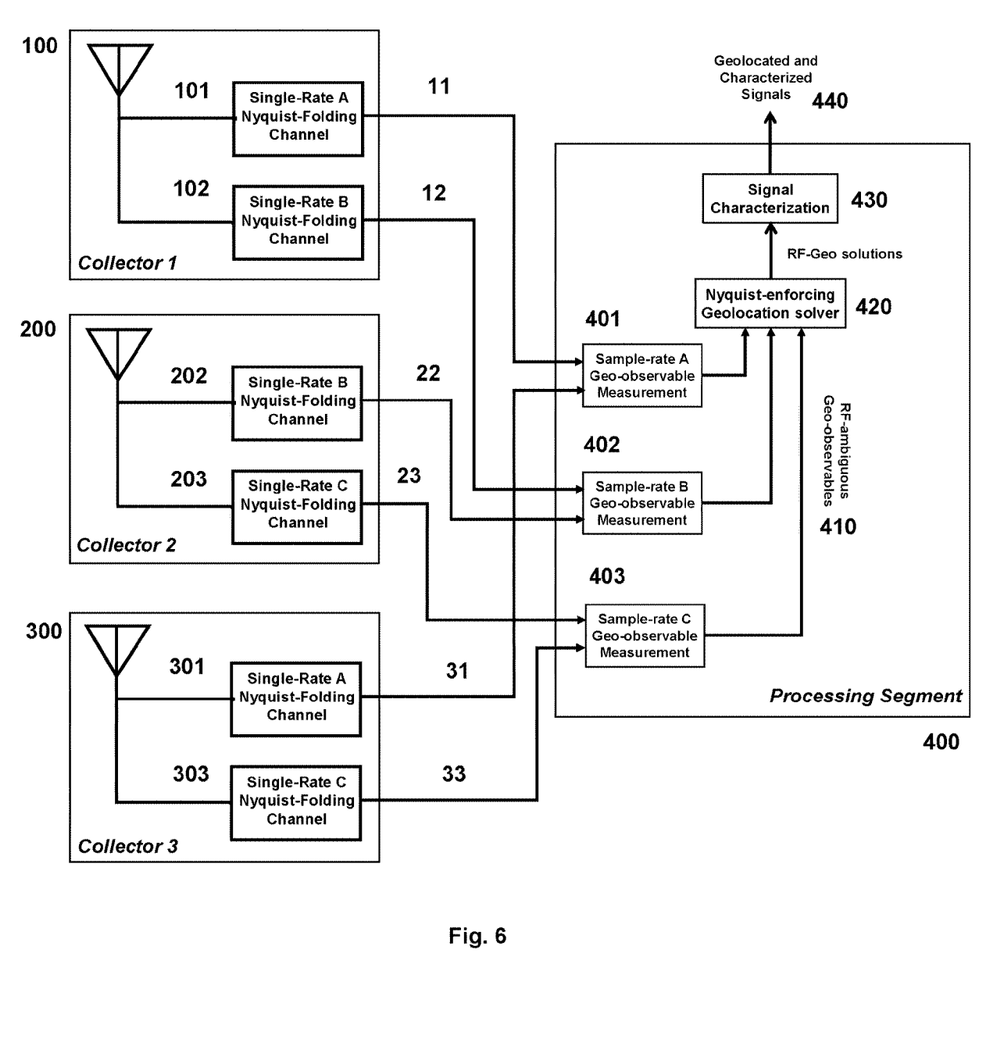
FIG. 6 is a block diagram of a geolocation system including multiple collectors and a processing center according to an embodiment of the present invention.

A First Embodiment of a TDOA/FDOA Geolocation System Using Nyquist-Folding Receivers A First embodiment is shown in FIG. 6 using three collectors each utilizing two samplers using one of three different sample rates. In this embodiment, the sample rates are staggered across the collectors such that no two collectors are using the same two sample rates, and each sample rate is used on exactly two different collectors. For example, collector 100 uses a sampler 101 at rate A which is paired with sampler 301 on collector 300. The samplers used on the collectors can be produced by either analog sampling or direct digitization as illustrated in FIG. 1. The collectors each produce 2 sample streams that contain digital samples, the sample rate at which the samples were measured, timing data, the Nyquist rate of the collector, and any other metadata as would be required to characterize the configuration of a remote digital receiver. Collector 100 produces streams 11 and 12, collector 200 produces streams 22 and 23, and collector 300 produces streams 31 and 33.

The sampled data streams produced by collectors 100, 200, and 300 are transmitted to a processer 400, typically at a remote location from the collectors, for processing. The processor combines spatial information carried in geo-observables computed from matched-rate cross-collector data, and frequency information carried in multiple simultaneously collected data streams sampled at different rates. Several different processing protocols are known, any of which can be incorporated into embodiments and variations described herein. In the first embodiment, the sampled streams are paired by sample rate prior to geo-observable processing. For example, stream 11 from collector 100 and stream 31 from collector 300 both use sample rate A and are paired for processing in geo-observable calculation module 401. Similarly, streams 12 and 22 using rate B are paired for processing by geo-observable calculation module 402, and streams 23 and 33 using rate C are paired for processing by geo-observable calculation module 403.

Geo-observable calculation modules 401, 402, and 403 compute geo-observables from rate-matched sample streams. The geo-observables can include, but are not limited to, Time Difference of Arrival, Frequency Difference of Arrival, or other geo-observables known to practitioners in the art. The geo-observables and associated metadata 410 also include ambiguous RF information that depends on the sample rate used, and the sample rate. The RF information is used to resolve the RF ambiguity when geo-observables computed at different sample rates are combined. The RF ambiguous geo-observables with RF and sample-rate metadata 410 produced by the geo-observable calculation modules 401, 402, and 403 are passed to a Nyquist-enforcing Geolocation Solver 420.

The Geolocation engine embedded in Nyquist-enforcing Geolocation Solver 420 has many variations known to a practitioner knowledgeable in the art. In all such variations, the geolocation engine will find sets of geo-observables that are mathematically consistent with the collected data being emitted from a single specific location in space. Embodiments of the invention add an additional consistency check to the standard geolocation processing in which the ambiguous RF and sample rate information attached to each geo-observable in a putative geolocation solution are consistent with the signal being emitted at a single specific frequency. Whereas certain sets of geo-observables are not consistent with a valid geolocation and can be easily tested mathematically, certain sets of RF measurements with their associated sample rates are not consistent with a valid frequency measurement that is also easy to check mathematically.

The geolocation solutions output by the Nyquist-enforcing Geolocation Solver 420 are passed to a signal characterization component 430 where any additional signal information is added before the final data product 440 is output.

Figure 7:
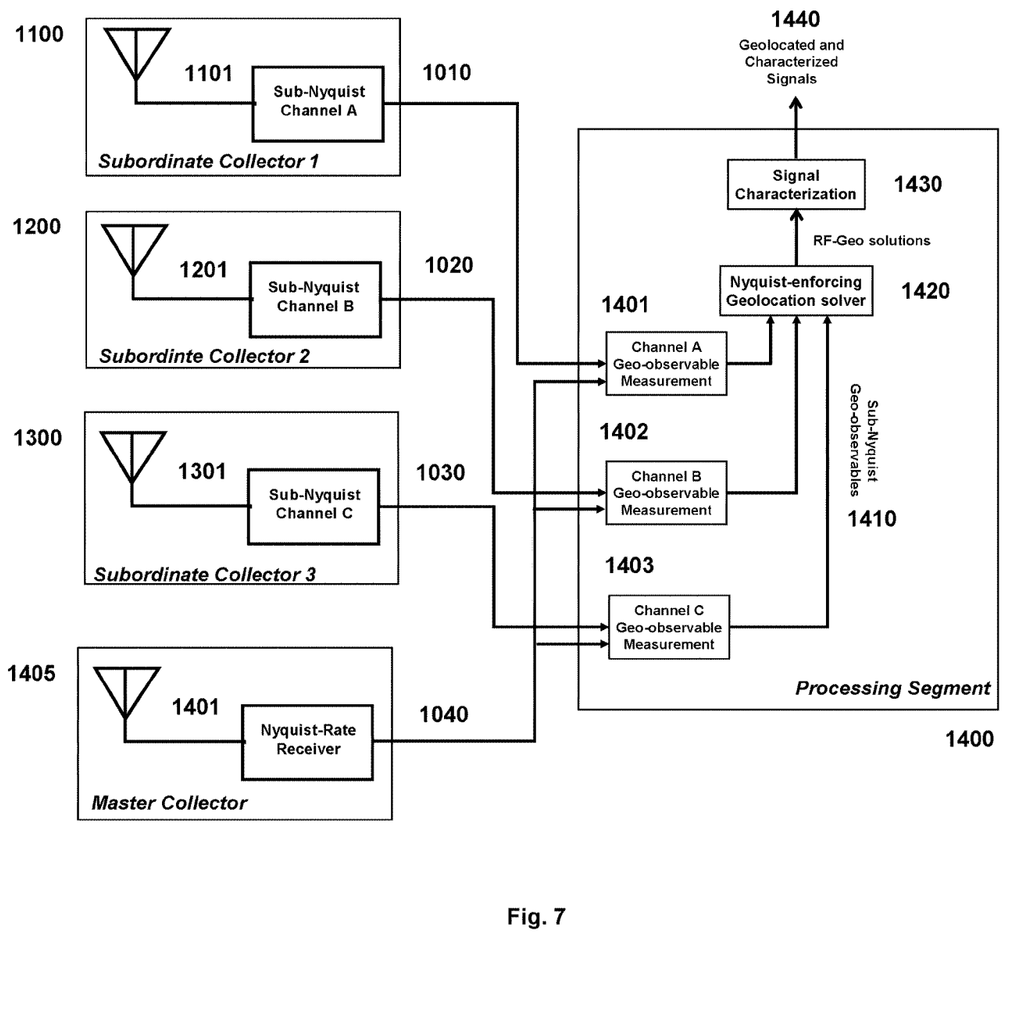
FIG. 7 is a block diagram of a geolocation system including multiple subordinate collectors, a master collector, and a processing center according to another embodiment of the present invention.

A Second and Third Embodiments of Geolocation Systems Using Nyquist-Folding Receivers The second and third embodiments are described with reference to FIG. 7, each of which uses a constellation of "subordinate collectors" (e.g., 1100, 1200, and 1300) with severely degraded geolocation capabilities in conjunction with a "master collector" (e.g., 1405). The data from the subordinate collectors is designed to be difficult or impossible to geolocate when used only with other subordinate collectors. However, the data from subordinate collectors 1100, 1200, 1300 can be combined with data from the master collector 1405 to create high-quality geolocations. This configuration is useful if access to the master collector 1405 and the processing enclave where the master collector data is combined with the subordinate collector data are secure.

The subordinate collectors 1100, 1200, 1300 can use one of two methods to ensure degraded geolocation. The first method is to use one or more constant-rate samplers on each collector such that no two collectors carry a sampler with the same rate. The second method is to use uneven samplers such that most time lags between two unevenly-sampled data streams from two different collectors have insufficient samples in common to support correlation. Additional embodiments exist in which uneven samplers are used in conjunction with one or more unique constant-rate samplers with the effect on correlation.

In the second embodiment, each collector uses one or more constant-rate samplers and no two collectors have a sampler with the same rate. Since all samplers that can be paired across collectors operate at different rates, production of cross-collector geo-observables, such as TDOA or FDOA is severely degraded. The master collector 1405 can operate at a higher constant-rate such that it enables correlation with one or more subordinate collectors. The most obvious approach is to operate the master collector 1405 at the Nyquist rate of the subordinate collectors 1100, 1200, 1300. However, any constant-rate sampler that has a high rate of sample overlap with a subset of the subordinate collectors will work.

As shown and described the second embodiment has three subordinate collectors 1100, 1200, 1300 operating a single constant-rate sub-Nyquist sampler. However, any number of collectors carrying one or more sub-Nyquist sampler is also contemplated. The subordinate collectors 1100, 1200, 1300 can each carry a sub-Nyquist sampler 1101, 1201, and 1301 respectively producing sub-sampled streams 1010, 1020, and 1030 respectively. The streams 1010, 1020, and 1030, each carry metadata indicating the sub-Nyquist sample rate and the Nyquist rate of the collector. In this embodiment, the master collector 1405 operates at the Nyquist rate of the subordinate collectors, but other embodiments are anticipated in which the master collector 1405 operates at lower sample rates that sill provide significant correlation capability against a subset of the subordinate streams.

The subordinate streams 1010, 1020, 1030 are each paired with a copy of the master stream 1040 in modules 1401, 1402, and 1403 where they are processed to produce cross-collector geo-observables, such as TDOA or FDOA. The sub-Nyquist geo-observables 1410 produced by modules 1401, 1402, and 1403 each carry metadata indicating the sampler rate of the subordinate collector and the master collector 1405, and the collector Nyquist rates that are used in RF ambiguity resolution. The sub-Nyquist geo-observables are passed to the Nyquist-enforcing Geolocation engine 1420 and are processed in the same manner as the first embodiment.

The third embodiment operates in substantially the same manner as the second embodiment with the exception that the Sub-Nyquist samplers 1101, 1201, 1301 on the subordinate collectors 1100, 1200, 1300 utilize uneven-interval samplers with low correlation between any two samplers. The uneven samplers are most easily created using a pseudo-random number generator, such as a Fibonacci Register, but embodiments are anticipated using other methods to create uneven sampling intervals. The unevenly-sampled data is transmitted to the processing segment 1400 where it is combined with a master collector data stream 1040 evenly sampled at Nyquist-rate or higher. All processing from modules 1401, 1402, and 1403 and forward in the process proceed the same as the first and second embodiments.

I claim:

1. A geolocation system comprising:
   four or more samplers, including first, second, third and fourth samplers, distributed across and located within three or more collectors, each collector being located at a different location relative to the other collectors, at least the first and second samplers having a sub-Nyquist first sampler rate and the first sampler being located within a different collector relative to the second sampler, and at least the third and fourth samplers having a sub-Nyquist rate second sampler rate, the second sampler rate being different from the first sampler rate, and the third sampler being located within a different collector relative to the second sampler and the fourth sampler; and
   a processing center for receiving Nyquist folded RF data from the three or more collectors, the processing center being configured to process the Nyquist folded RF data to calculate one or more geo-observables.

2. The system of claim 1, wherein the one or more geo-observables comprises at least one of a TDOA measurement and an FDOA measurement.

3. The system of claim 1, wherein the processing center further comprises a geolocation engine configured to receive the one or more geo-observables and verify spatial consistency and RF consistency of the Nyquist folded RF data.

4. A method of operating a geolocation system, the method comprising:
   providing access to the geolocation system, the geolocation system comprising (a) four or more samplers, including first, second, third and fourth samplers, distributed across and located within three or more collectors, each collector being located at a different location relative to the other collectors, at least the first and second samplers having a sub-Nyquist first sampler rate and the first sampler being located within a different collector relative to the second sampler, and at least the third and fourth samplers having a sub-Nyquist second sampler rate, the second sampler rate being different from the first sampler rate, and the third sampler being located within a different collector relative to the second sampler and the fourth sampler, and (b) a processing center for receiving a plurality of Nyquist-folded RF datasets from the three or more collectors;
   the first and second samplers sampling RF frequencies at the first sampler rate and generating first sampling rate Nyquist-folded RF datasets of the plurality of Nyquist-folded RF datasets;
   the third and fourth samplers sampling RF frequencies at the second sampler rate and generating second sampling rate Nyquist-folded RF datasets of the plurality of Nyquist-folded RF datasets;
   the processing center receiving the first and second sampling rate Nyquist-folded RF datasets; and
   the processing center processing the first and second sampling rate Nyquist-folded RF datasets to create one or more geo-observables.

5. The method of claim 4, wherein (i) the processing center further comprises a geolocation engine; and (ii) the method further comprises:
   the geolocation engine checking spatial consistency and RF consistency of the Nyquist-sampled datasets.

6. A method of operating a processing center of a geolocation system comprising at least first, second, third and fourth sub-Nyquist samplers distributed within three or more collectors located at diverse locations wherein (i) the first and second sub-Nyquist samplers operates at a first sampler rate and are each located within a different collector of the three or more collectors than the other, (ii) the third and fourth sub-Nyquist samplers operates at a second sampler rate different from the first sampler rate and the third sub-Nyquist sampler is located within a different collector of the three or more collectors than the second and fourth sub-Nyquist samplers, and (iii) each collector of the three or more collectors transmits Nyquist-folded RF datasets derived from the sub-Nyquist samplers resident within the collector, the method comprising:
   receiving the Nyquist-folded RF datasets from each of the three or more collectors; and processing the Nyquist-folded RF datasets to create one or more geo-observables.

7. The method of claim 6, wherein (i) the processing center includes a geolocation engine; and (ii) the method further comprises checking spatial consistency and RF consistency of the Nyquist-sampled datasets using the geolocation engine.

* * * * *